US010230618B2

(12) United States Patent
Dong et al.

(10) Patent No.: US 10,230,618 B2
(45) Date of Patent: Mar. 12, 2019

(54) PATH ACQUISITION METHOD, PATH COMPUTATION ELEMENT, PATH COMPUTATION CLIENT AND SYSTEM

(71) Applicant: Huawei Technologies Co., Ltd., Shenzhen (CN)

(72) Inventors: Jie Dong, Shenzhen (CN); Guoyi Chen, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 78 days.

(21) Appl. No.: 14/757,676

(22) Filed: Dec. 23, 2015

(65) Prior Publication Data

US 2016/0134509 A1    May 12, 2016

Related U.S. Application Data

(63) Continuation of application No. PCT/CN2014/079048, filed on Jun. 3, 2014.

(30) Foreign Application Priority Data

Jun. 26, 2013    (CN) .......................... 2013 1 0259488

(51) Int. Cl.
*H04L 12/717* (2013.01)
*H04L 12/751* (2013.01)

(52) U.S. Cl.
CPC .............. *H04L 45/02* (2013.01); *H04L 45/42* (2013.01)

(58) Field of Classification Search
CPC ................................ H04L 45/02; H04L 45/42
See application file for complete search history.

(56) References Cited

U.S. PATENT DOCUMENTS 6,542,469 B1 * 4/2003 Kelley ................... H04L 45/00
370/238
6,934,249 B1 * 8/2005 Bertin ................... H04L 45/00
370/218

(Continued)

FOREIGN PATENT DOCUMENTS

CN          1870570 A     11/2006
CN       101095311 A     12/2007

(Continued)

OTHER PUBLICATIONS

Vasseur et al., "Path Computation Element (PCE) Communication Protocol (PCEP)," Network Working Group, Request for Comments: 5440, IETF Trust, Reston, Virginia (Mar. 2009).

*Primary Examiner* — Ivan O Latorre
(74) *Attorney, Agent, or Firm* — Leydig, Voit & Mayer, Ltd.

(57) ABSTRACT

The present disclosure discloses a path request method. The method includes: receiving, by a stateful path computation element Stateful PCE, a path computation request message sent by a path computation client PCC, where the path computation request message includes first attribute information, and the first attribute information is used to designate an acquisition manner of a path requested by the PCC; acquiring, by the Stateful PCE, information of a path that conforms to a request of the PCC according to the first attribute information; and sending a path computation reply message to the PCC, where the path computation reply message includes the information of the path that conforms to the request of the PCC. Embodiments of the present disclosure also provide a stateful path computation element and a path computation client.

8 Claims, 5 Drawing Sheets

(56) References Cited

U.S. PATENT DOCUMENTS

| | | | |
|---|---|---|---|
| 8,009,669 B2* | 8/2011 | Lee | H04L 45/04 370/389 |
| 8,254,272 B1* | 8/2012 | Vasseur | H04L 41/0677 370/236.2 |
| 8,885,459 B2* | 11/2014 | Chen | H04L 45/42 370/221 |
| 9,450,817 B1* | 9/2016 | Bahadur | H04L 45/64 |
| 2006/0098657 A1* | 5/2006 | Vasseur | H04L 45/04 370/392 |
| 2006/0176820 A1* | 8/2006 | Vasseur | H04L 45/02 370/241 |
| 2006/0198308 A1* | 9/2006 | Vasseur | H04L 12/4633 370/238 |
| 2006/0250961 A1 | 11/2006 | Vasseur | |
| 2007/0217419 A1* | 9/2007 | Vasseur | H04L 12/66 370/392 |
| 2008/0002664 A1* | 1/2008 | Li | H04L 45/04 370/351 |
| 2008/0069010 A1 | 3/2008 | Zhang | |
| 2008/0130515 A1* | 6/2008 | Vasseur | H04L 12/4633 370/254 |
| 2008/0205271 A1* | 8/2008 | Aissaoui | H04L 12/66 370/235 |
| 2008/0225723 A1* | 9/2008 | Lee | H04L 45/00 370/235 |
| 2009/0080886 A1* | 3/2009 | Lee | H04L 45/00 398/48 |
| 2009/0245253 A1* | 10/2009 | Chen | H04L 12/18 370/390 |
| 2010/0034205 A1* | 2/2010 | Kusama | G06F 15/16 370/400 |
| 2010/0208733 A1* | 8/2010 | Zhao | H04L 12/185 370/390 |
| 2011/0019674 A1* | 1/2011 | Iovanna | H04L 45/02 370/392 |
| 2011/0081147 A1* | 4/2011 | Lee | H04L 41/0803 398/48 |
| 2011/0199939 A1* | 8/2011 | Zi | H04L 45/42 370/254 |
| 2011/0205902 A1 | 8/2011 | Zi et al. | |
| 2012/0069740 A1* | 3/2012 | Lu | H04L 45/04 370/238 |
| 2012/0134263 A1* | 5/2012 | Xiang | H04L 45/42 370/228 |
| 2012/0207467 A1 | 8/2012 | Lee | |
| 2013/0070638 A1* | 3/2013 | Iovanna | H04L 45/04 370/254 |
| 2013/0227146 A1* | 8/2013 | Wang | H04L 47/724 709/226 |
| 2014/0022997 A1 | 1/2014 | Xue et al. | |
| 2014/0098710 A1* | 4/2014 | Ong | H04L 41/12 370/255 |
| 2015/0128223 A1* | 5/2015 | Magri | H04L 45/42 726/4 |

FOREIGN PATENT DOCUMENTS

| | | |
|---|---|---|
| CN | 101645847 A | 2/2010 |
| CN | 101662422 A | 3/2010 |
| CN | 101729385 A | 6/2010 |
| CN | 101945035 A | 1/2011 |
| CN | 102196481 A | 9/2011 |
| EP | 2341672 A1 | 7/2011 |
| EP | 2458796 A1 | 5/2012 |
| WO | WO 2011035804 A1 | 3/2011 |

* cited by examiner

PATH ACQUISITION METHOD, PATH COMPUTATION ELEMENT, PATH COMPUTATION CLIENT AND SYSTEM

CROSS-REFERENCE TO RELATED APPLICATIONS

This application is a continuation of international Patent Application No. PCT/CN2014/079048, filed on Jun. 3, 2014, which claims priority to Chinese Patent Application No. 201310259488.5, filed on Jun. 26, 2013, both of which are hereby incorporated by reference in their entireties.

TECHNICAL FIELD

The present disclosure relates to communication technologies and, in particular, to a path acquisition method, a path computation element (PCE), a path computation client (PCC) and a system.

BACKGROUND

A PCE is a computation element in a path computation architecture of a multi-protocol label switching (MPLS) network, which may implement a centralized path computation based on various constraint conditions. A PCC is configured to initiate a path computation request and receive a path computation result, the PCE is configured to receive the path computation request from the PCC, perform a path computation according to the request, and return the path computation result to the PCC. A PCE communication protocol (PCEP) is a protocol for performing the path computation request and reply communications between the PCC and the PCE.

The PCE may be divided into two types: a Stateless PCE and a Stateful PCE. The Stateless PCE only stores network status information which specifically includes network topology information and resource information; while the Stateful PCE will also store information of already-established paths in a network and information of reserved resources used in addition to the network status information. Since the Stateful PCE has more network information, and thus may realize more abundant path computation functions. In an existing path computation method based on the PCEP, after receiving a computation request sent by the PCC, the PCE will compute a new path for the PCC according to the network status information, and when the PCE cannot compute a new path satisfying a condition, the PCE returns computation failure information to the PCC, and the PCC will not acquire an available path.

It can be seen that, the path computation method in the prior art is of poor flexibility, and is not adaptable to the above case, thereby limiting scalability of the network.

SUMMARY

Embodiments of the present disclosure provide a path acquisition method, a path computation element, a path computation client and a system, which are used to solve a technical problem of inflexible routing computation method in the prior art which limits network scalability.

In a first aspect, a path request method is provided, where the method includes:

receiving, by a Stateful PCE, a path computation request message sent by a PCC, where the path computation request message includes first attribute information, and the first attribute information is used to designate an acquisition manner of a path requested by the PCC;

acquiring, by the Stateful PCE, information of a path that conforms to a request of the PCC according to the first attribute information; and sending a path computation reply message to the PCC, where the path computation reply message includes the information of the path that conforms to the request of the PCC.

In a first possible implementation manner of the first aspect, the acquisition manner of the path requested by the PCC is: a manner of only accepting an already-established path, or a manner of preferably accepting the already-established path, or a manner of only accepting a to-be-newly-established path, or a manner of preferably accepting the to-be-newly-established path.

According to the first possible implementation manner of the first aspect, a second possible implementation manner of the first aspect is also provided, in the second possible implementation manner of the first aspect, when the acquisition manner of the path requested by the PCC is the manner of only accepting the already-established path, then the Stateful PCE searches a database of already-established path information, when there is a first path that conforms to the request of the PCC in the database, then the path computation reply message includes information of the first path; when there is not an already-established path that conforms to the request of the PCC in the database, then the path computation reply message includes an acquisition failure indication; or, when the acquisition manner of the path requested by the PCC is the manner of preferably accepting the already-established path, then the Stateful PCE searches the database, when there is a second path that conforms to the request of the PCC in the database, then the path computation reply message includes information of the second path; when there is not an already-established path that conforms to the request of the PCC in the database, then the Stateful PCE computes a new path according to the request of the PCC, when the computing is successful, then the path computation reply message includes information of a to-be-newly-established path acquired through computation, when the computing is not successful, then the path computation reply message includes the acquisition failure indication; or, when the acquisition manner of the path requested by the PCC is the manner of only accepting the to-be-newly-established path, then the Stateful PCE computes a new path according to the request of the PCC, when the computing is successful, the path computation reply message includes information of the to-be-newly-established path acquired through computation; when the computing is not successful, then the path computation reply message includes the acquisition failure indication; or, when the acquisition manner of the path requested by the PCC is the manner of preferably accepting the to-be-newly-established path, then the Stateful PCE computes a new path according to the request of the PCC, when the computing is successful, the path computation reply message includes information of a third path acquired through computation; when the computing is not successful, the Stateful PCE searches the database, when there is an already-established fourth path that conforms to the request of the PCC in the database, then the path computation reply message includes information of the fourth path, when there is not an already-established path that conforms to the request of the PCC in the database, then the path computation reply message includes the acquisition failure indication.

According to the first aspect or any possible implementation manners of the first aspect, a third possible implementation manner of the first aspect is further provided, in the third possible implementation manner of the first aspect, the path computation reply message further includes second attribute information, and the second attribute information is used to indicate an attribute of the path that conforms to the request of the PCC.

According to the third possible implementation manner of the first aspect, a fourth possible implementation manner of the first aspect is further provided, in the fourth possible implementation manner of the first aspect, the attribute of the path that conforms to the request of the PCC is: the path that conforms to the request of the PCC is the to-be-newly-established path, or the path that conforms to the request of the PCC is the already-established path.

In a second aspect, a path request method is provided, where the method includes:

sending, by a path computation client PCC, a path computation request message to a stateful path computation element Stateful PCE to request a path that conforms to a request of the PCC, where the path computation request message includes first attribute information, and the first attribute information is used to designate an acquisition manner of the path requested by the PCC;

receiving, by the PCC, a path computation reply message returned by the Stateful PCE, where the path computation reply message includes information of the path that conforms to the request of the PCC and is acquired according to the first attribute information; and establishing, by the PCC, a forwarding path according to the information of the path.

In a first possible implementation manner of the second aspect, the acquisition manner of the path requested by the PCC is: a manner of only accepting an already-established path, or a manner of preferably accepting the already-established path, or a manner of only accepting a to-be-newly-established path, or a manner of preferably accepting the to-be-newly-established path.

According to the second aspect or the first possible implementation manner of the second aspect, a third possible implementation manner of the second aspect is further provided, in the third possible implementation manner of the second aspect:

the path computation reply message further includes second attribute information, and the second attribute information is used to indicate an attribute of the path that conforms to the request of the PCC, and the attribute of the path that conforms to the request of the PCC is: the path that conforms to the request of the PCC is a to-be-newly-established path, or the path that conforms to the request of the PCC is an already-established path.

In a third aspect, a Stateful PCE is provided, where the Stateful PCE includes:

a receiving unit, configured to receive a path computation request message sent by a path computation client PCC, where the path computation request message includes first attribute information, and the first attribute information is used to designate an acquisition manner of a path requested by the PCC;

a processing unit, configured to acquire information of a path that conforms to a request of the PCC according to the first attribute information; and a sending unit, configured to send a path computation reply message to the PCC, where the path computation reply message includes the information of the path that conforms to the request of the PCC.

In a first possible implementation manner of the third aspect, the acquisition manner of the path requested by the PCC is: a manner of only accepting an already-established path, or a manner of preferably accepting an already-established path, or a manner of only accepting a to-be-newly-established path, or a manner of preferably accepting a to-be-newly-established path.

According to the first possible implementation manner of the third aspect, a second possible implementation manner of the third aspect is further provided, in the second possible implementation manner of the third aspect, the acquiring, by the processing unit, the path that conforms to a particular condition according to attribute information of the path requested, specifically includes:

when the acquisition manner of the path requested by the PCC is the manner of only accepting the already-established path, then the Stateful PCE searches a database of already-established path information, when there is a first path that conforms to the request of the PCC in the database, then the path computation reply message includes information of the first path; when there is not an already-established path that conforms to the request of the PCC in the database, then the path computation reply message includes an acquisition failure indication; or, when the acquisition manner of the path requested by the PCC is the manner of preferably accepting the already-established path, then the Stateful PCE searches the database, when there is a second path that conforms to the request of the PCC in the database, then the path computation reply message includes information of the second path; when there is not an already-established path that conforms to the request of the PCC in the database, then the Stateful PCE computes a new path according to the request of the PCC, when the computing is successful, the path computation reply message includes information of a to-be-newly-established path acquired through computation, when the computing is not successful, then the path computation reply message includes the acquisition failure indication; or, when the acquisition manner of the path requested by the PCC is the manner of only accepting the to-be-newly-established path, then the Stateful PCE computes a new path according to the request of the PCC, when the computing is successful, the path computation reply message includes information of the to-be-newly-established path acquired through computation; when the computing is not successful, then the path computation reply message includes the acquisition failure indication; or, when the acquisition manner of the path requested by the PCC is the manner of preferably accepting the to-be-newly-established path, then the Stateful PCE computes a new path according to the request of the PCC, when the computing is successful, the path computation reply message includes information of a third path acquired through computation; when the computing is not successful, the Stateful PCE searches the database, when there is an already-established fourth path that conforms to the request of the PCC in the database, then the path computation reply message includes information of the fourth path, when there is not an already-established path that conforms to the request of the PCC in the database, then the path computation reply message includes the acquisition failure indication.

In a fourth aspect, a PCC is provided, where the PCC includes:

a sending unit, configured to send a path computation request message to a stateful path computation element Stateful PCE to request a path that conforms to a request of the PCC, where the path computation request message includes first attribute information, and the first attribute information is used to designate an acquisition manner of the path requested by the PCC;

a receiving unit, configured to receive a path computation reply message returned by the Stateful PCE, where the path computation reply message includes information of the path that conforms to the request of the PCC and is acquired according to the first attribute information; and a processing unit, configured to establish a forwarding path according to the information of the path included in the path computation reply message received by the receiving unit.

In a first possible implementation manner of the fourth aspect, the acquisition manner of the path requested by the PCC is: a manner of only accepting an already-established path, or a manner of preferably accepting an already-established path, or a manner of only accepting a to-be-newly-established path, or a manner of preferably accepting a to-be-newly-established path.

In a fifth aspect, a path acquisition system is further provided, where the system includes: a stateful path computation element Stateful PCE and a path computation client PCC;

the PCC is configured to send a path computation request message to the Stateful PCE to request a path that conforms to a request of the PCC, where the path computation request message includes first attribute information, and the first attribute information is used to designate an acquisition manner of the path requested by the PCC;

the stateful PCE is configured to receive the path computation request message sent by the PCC, acquire information of the path that conforms to the request of the PCC according to the first attribute information included in the path computation request message, and send a path computation reply message to the PCC, where the path computation reply message includes the information of the path that conforms to the request of the PCC; and the PCC is further configured to receive the path computation reply message returned by the Stateful PCE, and establish a forwarding path according to the information of the path.

In a first possible implementation manner of the fifth aspect, the acquisition manner of the path requested by the PCC is: a manner of only accepting an already-established path, or a manner of preferably accepting an already-established path, or a manner of only accepting a to-be-newly-established path, or a manner of preferably accepting a to-be-newly-established path.

According to the first possible implementation manner of the fifth aspect, a second possible implementation manner of the fifth aspect is further provided, in the second possible implementation manner of the fifth aspect, the acquiring, by the Stateful PCE, the information of the path that conforms to the request of the PCC according to the first attribute information included in the path computation request message specifically includes:

when the acquisition manner of the path requested by the PCC is the manner of only accepting the already-established path, then the Stateful PCE searches a database of already-established path information, when there is a first path that conforms to the request of the PCC in the database, then the path computation reply message includes information of the first path; when there is not an already-established path that conforms to the request of the PCC in the database, then the path computation reply message includes an acquisition failure indication; or, when the acquisition manner of the path requested by the PCC is the manner of preferably accepting the already-established path, then the Stateful PCE searches the database, when there is a second path that conforms to the request of the PCC in the database, then the path computation reply message includes information of the second path; when there is not an already-established path that conforms to the request of the PCC in the database, then the Stateful PCE computes a new path according to the request of the PCC, when the computing is successful, the path computation reply message includes information of a to-be-newly-established path acquired through computation, when the computing is not successful, then the path computation reply message includes the acquisition failure indication; or, when the acquisition manner of the path requested by the PCC is the manner of only accepting the to-be-newly-established path, then the Stateful PCE computes a new path according to the request of the PCC, when the computing is successful, the path computation reply message includes information of the to-be-newly-established path acquired through computation; when the computing is not successful, then the path computation reply message includes the acquisition failure indication; or, when the acquisition manner of the path requested by the PCC is the manner of preferably accepting the to-be-newly-established path, then the Stateful PCE computes a new path according to the request of the PCC, when the computing is successful, the path computation reply message includes information of a third path acquired through computation; when the computing is not successful, the Stateful PCE searches the database, when there is an already established fourth path that conforms to the request of the PCC in the database, then the path computation reply message includes information of the fourth path, when there is not an already-established path that conforms to the request of the PCC in the database, then the path computation reply message includes the acquisition failure indication.

According to embodiments provided in the present disclosure, the present achieves the following technical effects:

by means of technical solutions provided in the embodiments of the present disclosure, when requesting a path from a Stateful PCE, a PCC can designate an acquisition manner of the path requested by the PCC, so that the Stateful PCE can acquire a path that conforms to a request of the PCC according to the designated acquisition manner, thereby achieving that the Stateful PCE selects a corresponding path according to a requirement of the PCC, providing the PCC with a more flexible path selecting solution, and improving scalability of the network.

BRIEF DESCRIPTION OF DRAWINGS

In order to make technical solutions in embodiments of the present disclosure clearer, accompanying drawings used for description of embodiments of the present disclosure will be briefly described hereunder. Obviously, the described drawings are merely some embodiments of present disclosure. For persons skilled in the art, other drawings may be obtained based on these drawings without any creative efforts.

DESCRIPTION OF EMBODIMENTS

Technical solutions in embodiments of the present disclosure are hereinafter described clearly and completely with reference to accompanying drawings in embodiments of the present disclosure. Obviously, the described embodiments are only a part of embodiments of the present disclosure, rather than all embodiments of the present disclosure. All other embodiments obtained by persons of ordinary skill in the art based on the embodiments of the present disclosure without any creative efforts shall fall within the protection scope of the present disclosure.

Figure 1:
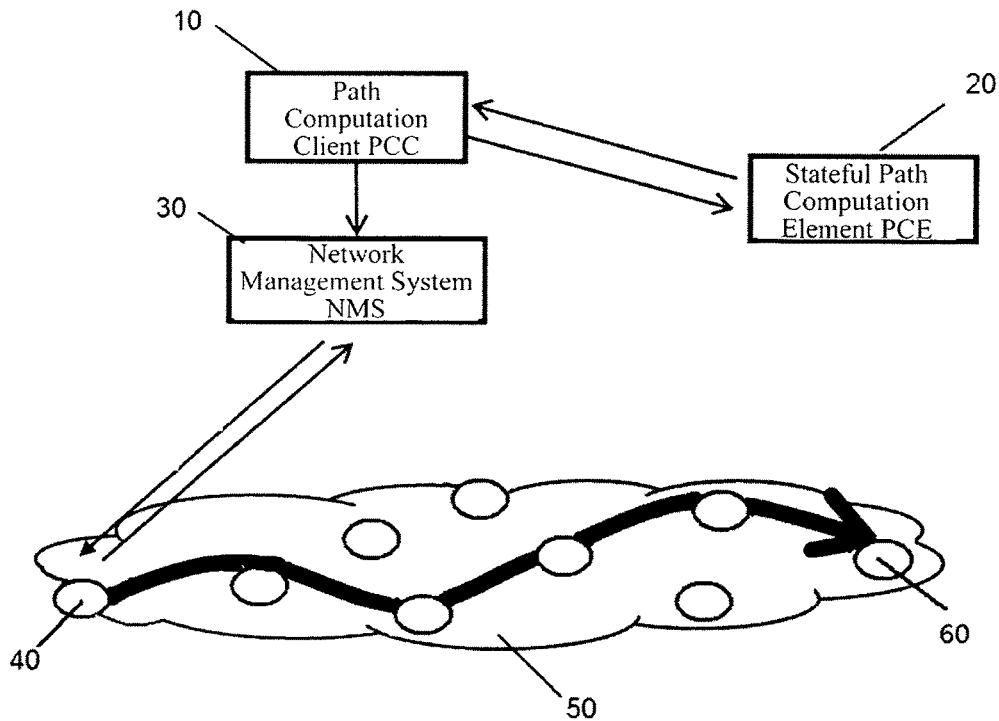
FIG. 1 is a structural diagram of a network with PCE-based centralized path computation and deployment.

Reference may be made to FIG. 1 which is a structural diagram of a network with PCE-based centralized path computation and deployment. When path information needs to be acquired, a PCC 10 sends a path computation request message (Path Computation Request, PCReq) to a PCE 20, where the PCReq is used to request a path that conforms to a request of the PCC. The PCE 20 returns a path computation reply message (Path Computation Reply, PCRep) to the PCC 10, where the PCRep includes information of a to-be-newly-established path that conforms to the request of the PCC. After receiving the information of the path, the PCC 10 sends the information of the path to a network management system (Network Management System, NMS) 30, the information of the path is forwarded to an ingress node (Ingress Node) 40 within a network 50 by the NMS 30, deployment and configuration of the path are performed by the Ingress 40 according to the information of the path, and the information of the path is forwarded to an egress node (Egress Node) 60.

In the model as shown in FIG. 1, the PCC 10 is not a device in the network 50, but instead is independent from the network 50. Thus, the PCC 10 does not know the information about already-established paths and resource status in the network. At this time, the PCC 10 may need to acquire an already-established path in the network which satisfies the particular condition. A method described in embodiments of the present disclosure can implement the above requirement of the PCC 10.

It should be noted that, the model as shown in FIG. 1 is merely a specific application scenario of the method described in the embodiments of the present disclosure. Certainly, the method described in the embodiments of the present disclosure may be, but not limited to being, applied in the scenario as shown in FIG. 1, as a matter of fact, the method described in the embodiments of the present disclosure may be used in any scenarios where a corresponding path needs to be acquired according to a requirement of the PCC.

Figure 2:
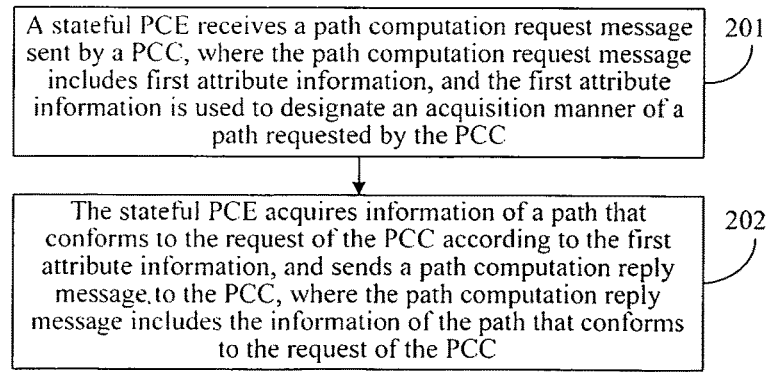
FIG. 2 is a flow chart of a path request method according to a first embodiment of the present disclosure.

Reference may be made to FIG. 2, a first embodiment of the present disclosure provides a path request method, and the method includes:

201. A Stateful PCE receives a path computation request message sent by a PCC, where the path computation request message includes first attribute information, and the first attribute information is used to designate an acquisition manner of a path requested by the PCC.

202. The Stateful PCE acquires information of a path that conforms to the request of the PCC according to the first attribute information, and sends a path computation reply message to the PCC, where the path computation reply message includes the information of the path that conforms to the request of the PCC.

Specifically, the acquisition manner of the path requested by the PCC is: a manner of only accepting an already-established path, or a manner of preferably accepting an already-established path, or a manner of only accepting a to-be-newly-established path, or a manner of preferably accepting a to-be-newly-established path.

According to the method described in the first embodiment of the present disclosure, the Stateful PCE acquires a path that conforms to a request of the PCC according to an acquisition manner of the path requested by the PCC as designated in a path computation request message sent by the PCC, and sends information of the path that conforms to the request of the PCC to the PCC via a path computation reply message. By using the embodiment of the present disclosure, the Stateful PCE can acquire the path that conforms to the request of the PCC according to the designated acquisition manner, thereby achieving that the Stateful PCE selects a corresponding path according to a requirement of the PCC, providing the PCC with a more flexible path selecting solution, and improving scalability of the network.

Figure 3:
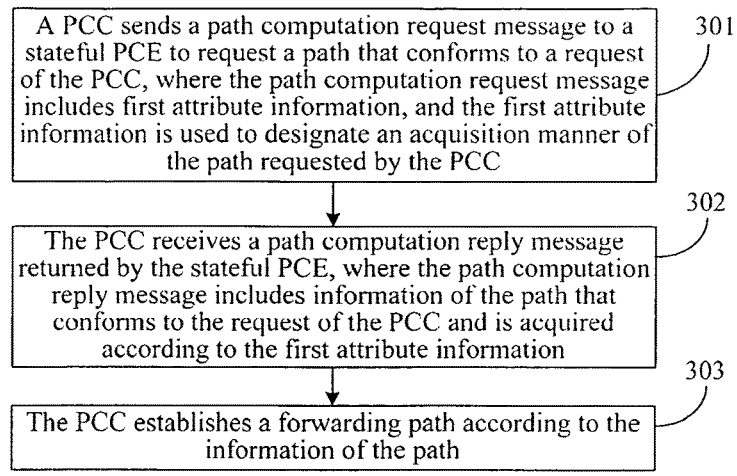
FIG. 3 is a flow chart of a path request method according to a second embodiment of the present disclosure.

Reference may be made to FIG. 3, a second embodiment of the present disclosure provides a path request method, and the method includes:

301. A PCC sends a path computation request message to a Stateful PCE to request a path that conforms to a request of the PCC, where the path computation request message includes first attribute information, and the first attribute information is used to designate an acquisition manner of the path requested by the PCC.

302. The PCC receives a path computation reply message returned by the Stateful PCE, where the path computation reply message includes information of the path that conforms to the request of the PCC and is acquired according to the first attribute information.

303. The PCC establishes a forwarding path according to the information of the path.

In the method as described in the second embodiment of the present disclosure, when requesting a path from the Stateful PCE, the PCC may designate an acquisition manner of a path requested by the PCC, so that the Stateful PCE can acquire a path that conforms to a request of the PCC according to the designated acquisition manner, thereby achieving that the Stateful PCE selects a corresponding path according to a requirement of the PCC, providing the PCC with a more flexible path selecting solution, and improving scalability of the network.

Figure 4:
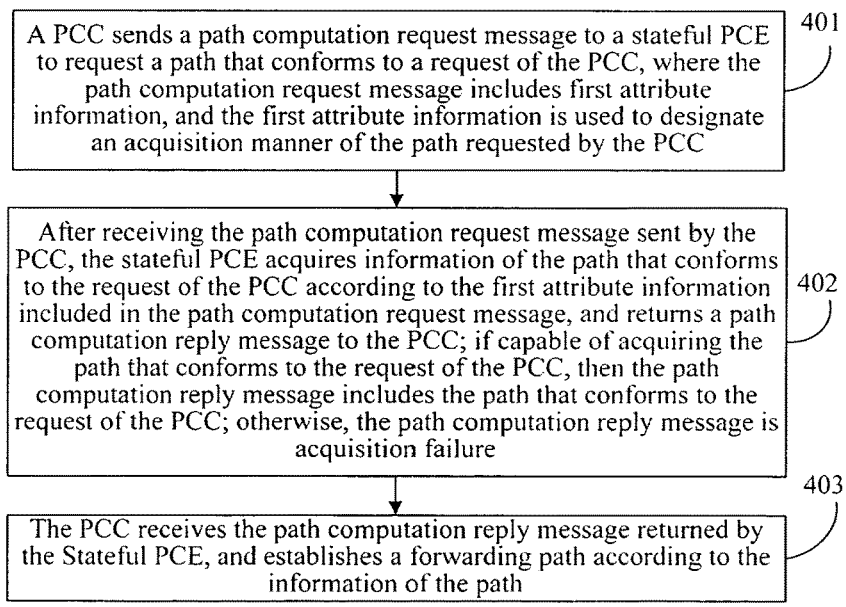
FIG. 4 is a flow chart of a path request method according to a third embodiment of the present disclosure.

Reference may be made to FIG. 4, a third embodiment of the present disclosure provides a path request method, and the method includes the following steps:

401. A PCC sends a path computation request message to a Stateful PCE to request a path that conforms to a request of the PCC, where the path computation request message includes first attribute information, and the first attribute information is used to designate an acquisition manner of the path requested by the PCC.

It should be noted that, the acquisition manner of the path requested by the PCC designated by the first attribute information may be: a manner of only accepting an already-established path, or a manner of preferably accepting an already-established path, or a manner of only accepting a to-be-newly-established path, or a manner of preferably accepting a to-be-newly-established path.

If the acquisition manner of the path requested by the PCC is the manner of only accepting the already-established path, then it indicates that the PCC only accepts an already-established path in a network, and when there is not an already-established path that conforms to the request of the PCC in the network, the PCC doesn't accept a path to-be-newly-established by the Stateful PCE.

If the acquisition manner of the path requested by the PCC is the manner of preferably accepting the already-established path, then it indicates that the PCC gives priority to accepting an already-established path in the network, and when there is not an already-established path that conforms to the request of the PCC in the network, the PCC accepts a to-be-newly-established path acquired by the Stateful PCE through computation.

If the acquisition manner of the path requested by the PCC is the manner of only accepting the to-be-newly-established path, then it indicates that the PCC only accepts a to-be-newly-established path computed by the Stateful PCE according to the request of the PCC, and when the computing by the Stateful PCE fails, even if there is an already-established path that conforms to the request of the PCC in the network, the PCC will not accept.

If the acquisition manner of the path requested by the PCC is the manner of preferably accepting the already-established path, then it indicates that the PCC gives priority to accepting a to-be-newly-established path computed by the Stateful PCE according to the request of the PCC, when the computing by the Stateful PCE fails, an already-established path that conforms to the request of the PCC in the network is accepted.

It should be noted that, the path computation request message includes first attribute information, which may be implemented by defining a new flag bit in the path computation request message and carrying the first attribute information in the new flag bit, specifically, may be implemented by defining a new flag bit in a request parameters object (Request Parameters object. RP object) of a path computation element communication protocol PCEP; or, implemented by defining a new flag bit in a label switching path attributes object (Label Switching Path Attributes object, LSPA object).

402. After receiving the path computation request message sent by the PCC, the Stateful PCE acquires information of the path that conforms to the request of the PCC according to the first attribute information included in the path computation request message, and returns a path computation reply message to the PCC, and if capable of acquiring the path that conforms to the request of the PCC, then the path computation reply message includes the path that conforms to the request of the PCC; otherwise, the path computation reply message includes an acquisition failure indication.

In further, the path computation reply message may also include second attribute information, and the second attribute information is used to indicate an attribute of the path that conforms to the request of the PCC. By carrying the second attribute information in the path computation reply message, the PCC may be provided with more comprehensive path information, so that the PCC may better use, manage, or further select a path.

Specifically, the attribute of the path that conforms to the request of the PCC is: the path that conforms to the request of the PCC is the to-be-newly-established path, or the path that conforms to the request of the PCC is the already-established path.

Specifically, if the acquisition manner of the path requested by the PCC is the manner of only accepting the already-established path, then the Stateful PCE searches a database storing already-established path information, if there is a first path that conforms to the request of the PCC in the database, then the path computation reply message includes information of the first path; if there is not an already-established path that conforms to the request of the PCC in the database, then the path computation reply message includes an acquisition failure indication.

If the acquisition manner of the path requested by the PCC is the manner of preferably accepting the already-established path, then the Stateful PCE searches the database firstly, if there is a second path that conforms to the request of the PCC in the database, then the path computation reply message includes information of the second path; if there is not an already-established path that conforms to the request of the PCC in the database, then the Stateful PCE computes a new path that conforms to the particular condition according to network topology and resource information, if the computing is successful, the path computation reply message includes information of the to-be-newly-established path acquired through computation, if the computing is not successful, then the path computation reply message includes an acquisition failure indication.

If the acquisition manner of the path requested by the PCC is the manner of only accepting the to-be-newly-established path, then the Stateful PCE computes a new path according to the request of the PCC, if the computing is successful, the path computation reply message includes information of the to-be-newly-established path acquired through computation; if the computing is not successful, then the path computation reply message includes an acquisition failure indication.

If the acquisition manner of the path requested by the PCC is the manner of preferably accepting the to-be-newly-established path, then the Stateful PCE computes a new path according to the request of the PCC, if the computing is successful, the path computation reply message includes information of a third path acquired through computation; if the computing is not successful, the Stateful PCE searches a database, if there is an already-established fourth path that conforms to the request of the PCC in the database, then the path computation reply message includes information of the fourth path, if not, then the path computation reply message includes an acquisition failure indication.

It should be noted that, the path computation reply message includes second attribute information, which may be implemented by defining a new flag bit in the path computation reply message and carrying the second attribute information in the new flag bit, specifically, may be implemented by defining a new flag bit in an RP object of the PCEP protocol; or, implemented by defining a new flag bit in an LSPA object.

403. The PCC receives the path computation reply message returned by the Stateful PCE, and establishes a forwarding path according to the information of the path.

In the method as described in the embodiment of the present disclosure, when requesting a path that conforms to a request of the PCC from the Stateful PCE, the PCC may designate an acquisition manner of the path requested by the PCC, where the acquisition manner may be a manner of only accepting an already-established path, or a manner of preferably accepting an already-established path, or a manner of only accepting a to-be-newly-established path, or a manner of preferably accepting a to-be-newly-established path. The Stateful PCE selects, according to the designated acquisition manner, whether to search a database for an already-established path that conforms to a condition, or to compute a path that conforms to a particular condition according to network topology and resource information, and may also indicate in a path computation reply message returned whether the returned path is the already-established path or the to-be-newly-established path.

By means of technical solutions provided in the embodiments of the present disclosure, the Stateful PCE may acquire a path that conforms to a request of the PCC according to the designated acquisition manner, thereby achieving that the Stateful PCE selects a corresponding path according to a requirement of the PCC, providing the PCC with a more flexible path selecting solution, and improving scalability of the network.

Figure 5:
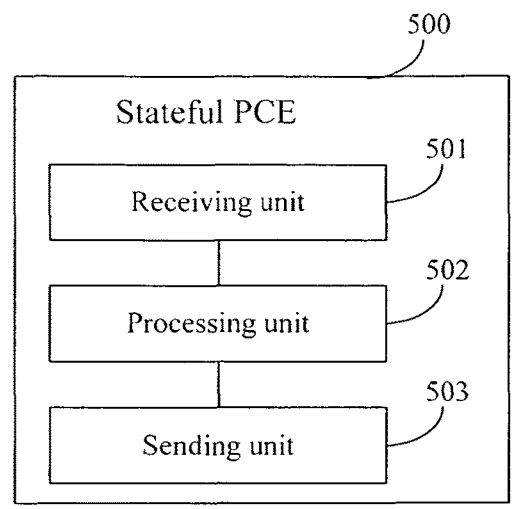
FIG. 5 is a structural diagram of a stateful path computation element according to the first embodiment of the present disclosure.

Reference may be made to FIG. 5. Corresponding to a path request method provided in embodiments of the present disclosure, an embodiment of the present disclosure also provides a Stateful PCE 500. The Stateful PCE 500 includes: a receiving unit 501, a processing unit 502, and a sending unit 503.

The receiving unit 501 is configured to receive a path computation request message sent by a path computation client PCC, where the path computation request message includes first attribute information, and the first attribute information is used to designate an acquisition manner of a path requested by the PCC.

The processing unit 502 is configured to acquire information of a path that conforms to a request of the PCC according to the first attribute information.

The sending unit 503 is configured to send a path computation reply message to the PCC, where the path computation reply message includes the information of the path that conforms to the request of the PCC.

The Stateful path computation element PCE according to the embodiment of the present disclosure acquires a path that conforms to a request of the PCC according to an acquisition manner of the path requested by the PCC as designated in a path computation request message sent by the PCC, and sends information of the path that conforms to the request of the PCC to the PCC via a path computation reply message. By using the embodiment of the present disclosure, the Stateful PCE can acquire the path that conforms to the request of the PCC according to the designated acquisition manner, thereby achieving that the Stateful PCE selects a corresponding path according to a requirement of the PCC, providing the PCC with a more flexible path selecting solution, and improving scalability of the network.

Specifically, the acquisition manner of the path requested by the PCC is a manner of only accepting an already-established path, or a manner of preferably accepting an already-established path, or a manner of only accepting a to-be-newly-established path, or a manner of preferably accepting a to-be-newly-established path.

Alternatively, the acquiring, by the processing unit 502, the path that conforms to a particular condition according to attribute information of the path requested, specifically includes:

if the acquisition manner of the path requested by the PCC is the manner of only accepting the already-established path, then the Stateful PCE searches a database of already-established path information, if there is a first path that conforms to the request of the PCC in the database, then the path computation reply message includes information of the first path; if there is not an already-established path that conforms to the request of the PCC in the database, then the path computation reply message includes an acquisition failure indication; or, if the acquisition manner of the path requested by the PCC is the manner of preferably accepting the already-established path, then the Stateful PCE searches the database, if there is a second path that conforms to the request of the PCC in the database, then the path computation reply message includes information of the second path; if there is not an already-established path that conforms to the request of the PCC in the database, then the Stateful PCE computes a new path according to the request of the PCC, if the computing is successful, the path computation reply message includes information of the to-be-newly-established path acquired through computation, if the computing is not successful, then the path computation reply message includes the acquisition failure indication; or, if the acquisition manner of the path requested by the PCC is the manner of only accepting the to-be-newly-established path, then the Stateful PCE computes a new path according to the request of the PCC, if the computing is successful, the path computation reply message includes information of the to-be-newly-established path acquired through computation; if the computing is not successful, then the path computation reply message includes the acquisition failure indication; or, if the acquisition manner of the path requested by the PCC is the manner of preferably accepting the to-be-newly-established path, then the Stateful PCE computes a new path according to the request of the PCC, if the computing is successful, the path computation reply message includes information of a third path acquired through computation; if the computing is not successful, the Stateful PCE searches the database, if there is an already-established fourth path that conforms to the request of the PCC in the database, then the path computation reply message includes information of the fourth path, if there is not an already-established path that conforms to the request of the PCC in the database, then the path computation reply message includes the acquisition failure indication.

Alternatively, the path computation reply message may also include second attribute information, and the second attribute information is used to indicate an attribute of the path that conforms to the request of the PCC. The attribute of the path that conforms to the request of the PCC is: the path that conforms to the request of the PCC is the to-be-newly-established path, or the path that conforms to the request of the PCC is the already-established path.

Figure 6:
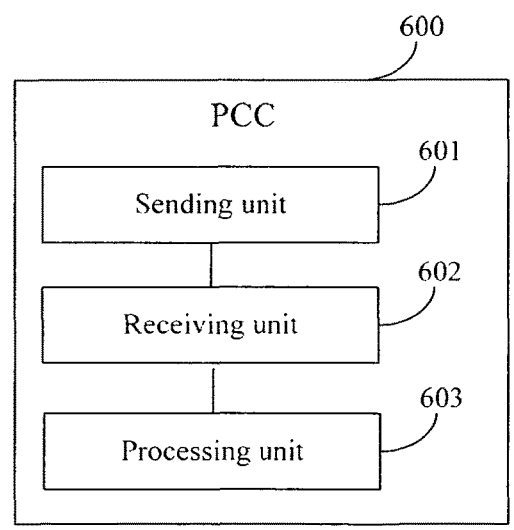
FIG. 6 is a structural diagram of a path computation client according to the first embodiment of the present disclosure.

Reference may be made to FIG. 6. Corresponding to a path request method provided in the embodiments of the present disclosure, and an embodiment of the present disclosure also provides a PCC 600. The PCC 600 includes: a sending unit 601, a receiving unit 602, and a processing unit 603.

The sending unit 601 is configured to send a path computation request message to a stateful path computation element Stateful PCE to request a path that conforms to a request of the PCC, where the path computation request message includes first attribute information, and the first attribute information is used to designate an acquisition manner of the path requested by the PCC.

The receiving unit 602 is configured to receive a path computation reply message returned by the Stateful PCE, where the path computation reply message includes information of the path that conforms to the request of the PCC and is acquired according to the first attribute information.

The processing unit 603 is configured to establish a forwarding path according to the information of the path included in the path computation reply message received by the receiving unit.

The path computation client PCC according to the embodiment of the present disclosure may designate an acquisition manner of the path requested by the PCC when requesting a path from a Stateful PCE, so that the Stateful PCE can acquire a path that conforms to a request of the PCC according to the designated acquisition manner, thereby achieving that the Stateful PCE selects a corresponding path according to a requirement of the PCC, providing the PCC with a more flexible path selecting solution, and improving scalability of the network.

Specifically, the acquisition manner of the path requested by the PCC may be: a manner of only accepting an already-established path, or a manner of preferably accepting all already-established path, or a manner of only accepting a to-be-newly-established path, or a manner of preferably accepting a to-be-newly-established path.

Alternatively, the path computation reply message may also include second attribute information, and the second attribute information is used to indicate an attribute of the path that conforms to the request of the PCC. The attribute of the path that conforms to the request of the PCC is: the path that conforms to the request of the PCC is the to-be-newly-established path, and the path that conforms to the request of the PCC is the already-established path.

Figure 7:
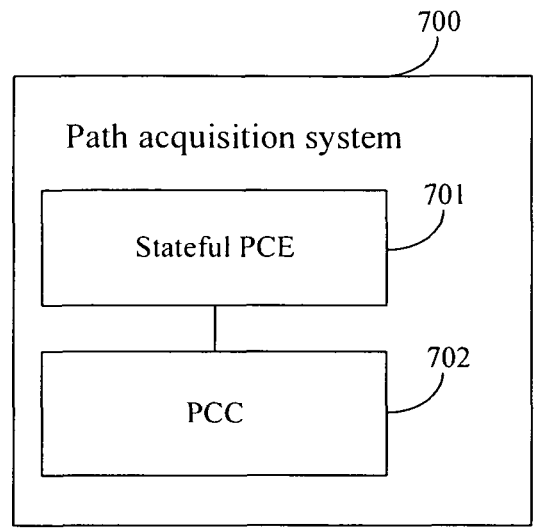
FIG. 7 is a structural diagram of a path acquisition system according to an embodiment of the present disclosure.

Reference may be made to FIG. 7. An embodiment of the present disclosure further provides a path acquisition system 700. The path acquisition system 700 includes: a Stateful path computation element PCE 701 and a path computation client PCC 702.

The PCC 702 is configured to send a path computation request message to the Stateful PCE 701 to request a path that conforms to a request of the PCC 702, where the path computation request message includes first attribute information, and the first attribute information is used to designate an acquisition manner of the path requested by the PCC 702.

The Stateful PCE 701 is configured to receive the path computation request message sent by the PCC 702; acquire information of the path that conforms to the request of the PCC according to the first attribute information included in the path computation request message; send a path computation reply message to the PCC 702, where the path computation reply message includes the information of the path that conforms to the request of the PCC 702.

The PCC 702 is further configured to receive the path computation reply message returned by the Stateful PCE 701, and establish a forwarding path according to the information of the path.

In the system as described in the embodiment of the present disclosure, the Stateful PCE 701 acquires a path that conforms to a request of the PCC 702 according to an acquisition manner of the path requested by the PCC 702 as designated in a path computation request message sent by the PCC 702, and sends information of the path that conforms to the request of the PCC 702 to the PCC 702 via a path computation reply message. By using embodiments of the present disclosure, the Stateful PCE 701 may acquire the path that conforms to the request of the PCC 702 according to the designated acquisition manner, thereby achieving that the Stateful PCE 701 selects a corresponding path according to a requirement of the PCC 702, providing the PCC 702 with a more flexible path selecting solution, and improving expansion of the network.

By using the embodiment of the present disclosure, a corresponding path can be selected according to a requirement of the PCC 702, so that a more flexible and abundant path request function is realized, and expansion of the network is improved. Especially, when the PCC 702 requests an already-established path that conforms to the particular condition, establishment of a new path in the network may be avoided, thereby saving overhead of a control signaling and status maintenance for newly establishing the path, improving expansion of the network, and more efficiently utilizing a network resource simultaneously.

Specifically, the acquisition manner of the path requested by the PCC 702 is a manner of only accepting an already-established path, or a manner of preferably accepting an already-established path, or a manner of only accepting a to-be-newly-established path, or a manner of preferably accepting a to-be-newly-established path.

Alternatively, the acquiring, by the Stateful PCE 701, the information of the path that conforms to the request of the PCC according to the first attribute information included in the path computation request message is specifically:

if the acquisition manner of the path requested by the PCC 702 is the manner of only accepting the already-established path, then the Stateful PCE 701 searches a database of already-established path information, if there is a first path that conforms to the request of the PCC 702 in the database, then the path computation reply message includes information of the first path; if there is not an already-established path that conforms to the request of the PCC 702 in the database, then the path computation reply message includes an acquisition failure indication; or, if the acquisition manner of the path requested by the PCC 702 is the manner of preferably accepting the already-established path, then the Stateful PCE 701 searches the database, if there is a second path that conforms to the request of the PCC 702 in the database, then the path computation reply message includes information of the second path; if there is not an already-established path that conforms to the request of the PCC 702 in the database, then the Stateful PCE 701 computes a new path according to the request of the PCC 702, if the computing is successful, the path computation reply message includes information of the to-be-newly-established path acquired through computation, if the computing is not successful, then the path computation reply message includes the acquisition failure indication; or, if the acquisition manner of the path requested by the PCC 702 is the manner of only accepting the to-be-newly-established path, then the Stateful PCE 701 computes a new path according to the request of the PCC 702, if the computing is successful, the path computation reply message includes information of the to-be-newly-established path acquired through computation; if the computing is not successful, then the path computation reply message includes the acquisition failure indication; or, if the acquisition manner of the path requested by the PCC 702 is the manner of preferably accepting the to-be-newly-established path, then the Stateful PCE 701 computes a new path according to a request of the PCC 702, if the computing is successful, the path computation reply message includes information of a third path acquired through computation; if the computing is not successful, the Stateful PCE 701 searches a database, if there is an already-established fourth path that conforms to the request of the PCC 702 in the database, then the path computation reply message includes information of the fourth path, if there is not an already-established path that conforms to the request of the PCC 702 in the database, then the path computation reply message is acquisition failure.

Figure 8:
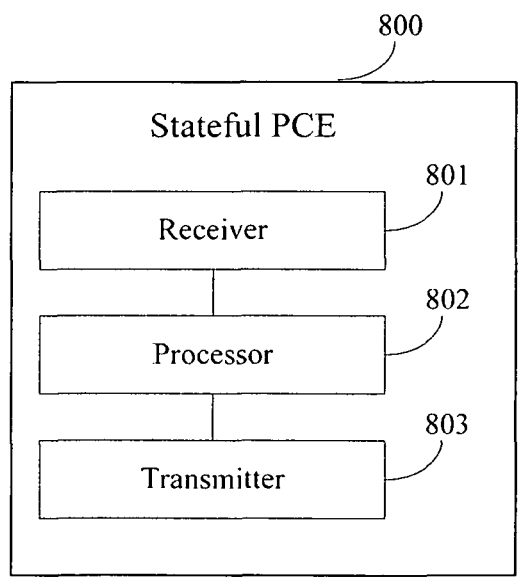
FIG. 8 is a structural diagram of a stateful path computation element according to the second embodiment of the present disclosure.

Reference may be made to FIG. 8. Corresponding to a path acquisition method provided in the embodiments of the present disclosure, an embodiment of the present disclosure further provides a Stateful PCE. The Stateful PCE 800 includes: a receiver 801, a processor 802, and a transmitter 803.

The receiver 801 is configured to receive a path computation request message sent by a path computation client PCC, where the path computation request message includes first attribute information, and the first attribute information is used to designate an acquisition manner of a path requested by the PCC.

The processor 802 is configured to acquire information of a path that conforms to a request of the PCC according to the first attribute information.

The transmitter 803 is configured to send a path computation reply message to the PCC, where the path computation reply message includes the information of the path that conforms to the request of the PCC.

The Stateful path computation element PCE according to the embodiment of the present disclosure acquires a path that conforms to a request of the PCC based on an acquisition manner of the path requested by the PCC as designated in a path computation request message sent by the PCC, and sends information of the path that conforms to the request of the PCC to the PCC via a path computation reply message. By using the embodiment of the present disclosure, the Stateful PCE can acquire the path that conforms to the request of the PCC according to the designated acquisition manner, thereby achieving that the Stateful PCE selects a corresponding path according to a requirement of the PCC, providing the PCC with a more flexible path selecting solution, and improving scalability of the network.

Specifically, the acquisition manner of the path requested by the PCC is: a manner of only accepting an already-established path, or a manner of preferably accepting an already-established path, or a manner of only accepting a to-be-newly-established path, or a manner of preferably accepting a to-be-newly-established path.

Alternatively, the acquiring, by the processor 802, the path that conforms to a particular condition according to attribute information of the path requested, specifically includes:

if the acquisition manner of the path requested by the PCC is the manner of only accepting the already-established path, then the Stateful PCE searches a database of already-established path information, if there is a first path that conforms to the request of the PCC in the database, then the path computation reply message includes information of the first path; if there is not an already-established path that conforms to the request of the PCC in the database, then the path computation reply message includes an acquisition failure indication; or, if the acquisition manner of the path requested by the PCC is the manner of preferably accepting the already-established path, then the Stateful PCE searches the database, if there is a second path that conforms to the request of the PCC in the database, then the path computation reply message includes information of the second path; if there is not an already-established path that conforms to the request of the PCC in the database, then the Stateful PCE computes a new path according to the request of the PCC, if the computing is successful, the path computation reply message includes information of the to-be-newly-established path acquired through computation, if the computing is not successful, then the path computation reply message includes the acquisition failure indication; or, if the acquisition manner of the path requested by the PCC is the manner of only accepting the to-be-newly-established path, then the Stateful PCE computes a new path according to the request of the PCC, if the computing is successful, the path computation reply message includes information of the to-be-newly-established path acquired through computation; if the computing is not successful, then the path computation reply message includes the acquisition failure indication; or, if the acquisition manner of the path requested by the PCC is the manner of preferably accepting the to-be-newly-established path, then the Stateful PCE computes a new path according to the request of the PCC, if the computing is successful, the path computation reply message includes information of a third path acquired through computation; if the computing is not successful, the Stateful PCE searches a database, if there is an already-established fourth path that conforms to the request of the PCC in the database, then the path computation reply message includes information of the fourth path, if there is not an already-established path that conforms to the request of the PCC in the database, then the path computation reply message is acquisition failure.

Alternatively, the path computation reply message may also include second attribute information, and the second attribute information is used to indicate an attribute of the path that conforms to the request of the PCC. The attribute of the path that conforms to the request of the PCC is: the path that conforms to the request of the PCC is the to-be-newly-established path, or the path that conforms to the request of the PCC is the already-established path.

Figure 9:
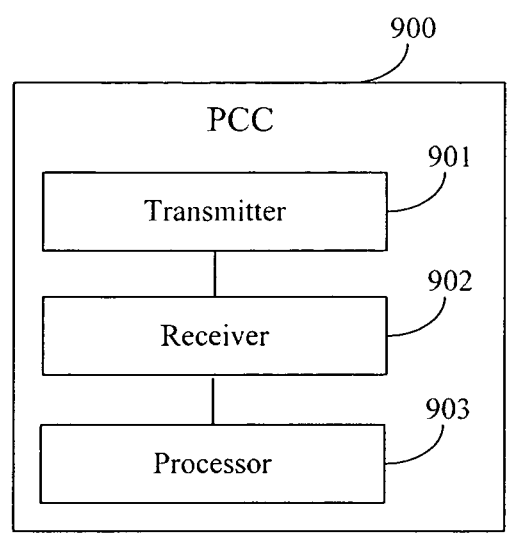
FIG. 9 is a structural diagram of a path computation client according to the second embodiment of the present disclosure.

Reference may be made to FIG. 9. Corresponding to a path acquisition method provided in the embodiments of the present disclosure, an embodiment of the present disclosure further provides a PCC 900. As shown in FIG. 9, the PCC 900 includes: a transmitter 901, a receiver 902, and a processor 903.

The transmitter 901 is configured to send a path computation request message to a stateful path computation element Stateful PCE to request a path that conforms to a request of the PCC, where the path computation request message includes first attribute information, and the first attribute information is used to designate an acquisition manner of the path requested by the PCC.

The receiver 902 is configured to receive a path computation reply message returned by the Stateful PCE, where the path computation reply message includes information of the path that conforms to the request of the PCC and is acquired according to the first attribute information.

The processor 903 is configured to establish a forwarding path according to the information of the path included in the path computation reply message received by the receiver.

When requesting a path to a Stateful PCE, a path computation client PCC according to the embodiment of the present disclosure can designate an acquisition manner of the path requested by the PCC, so that the Stateful PCE can acquire a path that conforms to a request of the PCC according to the designated acquisition manner, thereby achieving that the Stateful PCE selects a corresponding path according to a requirement of the PCC, providing the PCC with a more flexible path selecting solution, and improving expansion of the network.

Specifically, the acquisition manner of the path requested by the PCC may be: a manner of only accepting an already-established path, or a manner of preferably accepting an already-established path, or a manner of only accepting a to-be-newly-established path, or a manner of preferably accepting a to-be-newly-established path.

Alternatively, the path computation reply message may also include second attribute information, and the second attribute information is used to indicate an attribute of the path that conforms to the request of the PCC. The attribute of the path that conforms to the request of the PCC is: the path that conforms to the request of the PCC is the to-be-newly-established path, or the path that conforms to the request of the PCC is the already-established path.

It can be known from description of the above implementations that, persons skilled in the art can clearly know that the present application may be implemented by virtue of a software plus necessary general hardware platform. Based on such understanding, technical solutions of the present application substantively, or a part thereof making a contribution to the prior art may be embodied in a form of a software product, the computer software produce may be stored in a storage medium such as an ROM/RAM, a magnetic disc, an optical disc, etc., including several instructions to enable a computer device (which may be a personal computer, a server, or a network device) to execute methods described in embodiments of the present application or some parts of the embodiments.

Embodiments in the present specification are described in a progressive manner, and reference may be made to respective embodiments for the same or similar parts therebetween. Each embodiment focuses on its difference from other embodiments. Especially, since the system or the system embodiments are similar to the method embodiments basically, thus the description thereof is relatively simple. For a related part, reference may be made to a part of description of the method embodiments. The system and the system embodiments described above are merely exemplary, the units described as separate parts may or may not be physically separate, and parts displayed as units may or may not be physical units, that is, may be located in one position, or may be distributed on a plurality of network units. A part or all of the modules may be selected according to actual needs to achieve the objectives of the solutions of the embodiments, which may be understood and implemented by persons skilled in the art without any creative efforts.

The method and system provided in the present application are described above in detail, and specific examples are used herein to elaborate the principles and implementations of the present application, the description of the above embodiments are merely used to assist in understanding the methods and the core idea of the present application; meanwhile, for persons of ordinary skill in the art, modifications may be made to the specific implementations and the application range according to the idea of the present application. In conclusion, the content of the specification should not be interpreted as limiting the present application.

What is claimed is:

1. A path request method, comprising:
    receiving, by a stateful path computation element (Stateful PCE), a path computation request message sent by a path computation client (PCC), wherein the path computation request message comprises first attribute information that designates an acquisition manner of a path requested by the PCC;
    acquiring, by the Stateful PCE, information of a path that conforms to a request of the PCC according to the first attribute information, wherein acquiring the information of the path that conforms to the request of the PCC comprises searching a database for an already-established path or computing a to-be-newly established path; and
    sending a path computation reply message to the PCC, wherein the path computation reply message comprises the information of the path that conforms to the request of the PCC;
    wherein the acquisition manner of the path requested by the PCC is:
        a manner of only accepting an already-established path in the database, or
        a manner of preferably accepting the already-established path, wherein the PCC gives priority to accepting an already-established path in the database, and when there is not an already-established path that conforms to the request of the PCC, the PCC accepts a to-be-newly-established path acquired by the Stateful PCE through computation, or
        a manner of only accepting a to-be-newly-established path, or
        a manner of preferably accepting the to-be-newly-established path, wherein the PCC gives priority to accepting a to-be-newly-established path computed by the Stateful PCE according to the request of the PCC, and when the computing the to-be-newly-established path by the Stateful PCE fails, an already-established path that conforms to the request of the PCC is accepted;
    wherein the path computation reply message further comprises second attribute information that indicates an attribute of the path that conforms to the request of the PCC, wherein the attribute of the path that conforms to the request of the PCC is:
        the path that conforms to the request of the PCC is a to-be-newly-established path, or
        the path that conforms to the request of the PCC is an already-established path.

2. The method according to claim 1, wherein:
    when the acquisition manner of the path requested by the PCC is the manner of only accepting the already-established path, then the Stateful PCE searches the database of already-established path information, wherein when there is a first path that conforms to the request of the PCC in the database, then the path computation reply message comprises information of the first path; and, wherein when there is not an already-established path that conforms to the request of the PCC in the database, then the path computation reply message comprises an acquisition failure indication; or,
    when the acquisition manner of the path requested by the PCC is the manner of preferably accepting the already-established path, then the Stateful PCE searches the database, when there is a second path that conforms to the request of the PCC in the database, then the path computation reply message comprises information of the second path; wherein when there is not an already-established path that conforms to the request of the PCC in the database, then the Stateful PCE computes a new path according to the request of the PCC, when the computing is successful, then the path computation reply message comprises information of the to-be-newly-established path acquired through computation, when the computing is not successful, then the path computation reply message comprises the acquisition failure indication; or, when the acquisition manner of the path requested by the PCC is the manner of only accepting the to-be-newly-established path, then the Stateful PCE computes a new path according to the request of the FCC; wherein when the computing is successful, the path computation reply message comprises information of the to-be-newly-established path acquired through computation; and, wherein when the computing is not successful, then the path computation reply message comprises the acquisition failure indication; or, when the acquisition manner of the path requested by the PCC is the manner of preferably accepting the to-be-newly-established path, then the Stateful PCE computes a new path according to the request of the PCC, when the computing is successful, the path computation reply message comprises information of a third path acquired through computation;

when the computing is not successful, the Stateful PCE searches the database, when there is an already-established fourth path that conforms to the request of the PCC in the database, then the path computation reply message comprises information of the fourth path, when there is not an already-established path that conforms to the request of the PCC in the database, then the path computation reply message comprises the acquisition failure indication.

3. A path request method, comprising:

sending, by a path computation client (PCC), a path computation request message to a stateful path computation element (Stateful PCE) to request a path that conforms to a request of the PCC, wherein the path computation request message comprises first attribute information that designates an acquisition manner of the path requested by the PCC;

receiving, by the PCC, a path computation reply message returned by the Stateful PCE, wherein the path computation reply message comprises information of the path that conforms to the request of the PCC and is acquired according to the first attribute information, wherein acquiring the information of the path that conforms to the request of the PCC by the Stateful PCE comprises searching a database for an already-established path or computing a to-be-newly established path, wherein the path computation reply message further comprises second attribute information, and the second attribute information is used to indicate an attribute of the path that conforms to the request of the PCC, and the attribute of the path that conforms to the request of the PCC is: the path that conforms to the request of the FCC is a to-be-newly-established path, or the path that conforms to the request of the PCC is an already-established path; and establishing, by the PCC, a forwarding path according to the information of the path;

wherein the acquisition manner of the path requested by the PCC is:

a manner of only accepting an already-established path in the database, or a manner of preferably accepting the already-established path, wherein the PCC gives priority to accepting an already-established path in the database, and when there is not an already-established path that conforms to the request of the PCC, the PCC accepts a to-be-newly-established path acquired by the Stateful PCE through computation, or a manner of only accepting a to-be-newly-established path, or a manner of preferably accepting the to-be-newly-established path, wherein the PCC gives priority to accepting a to-be-newly-established path computed by the Stateful PCE according to the request of the PCC, and when the computing the to-be-newly-established path by the Stateful PCE fails, an already-established path that conforms to the request of the PCC is accepted.

4. A stateful path computation element (Stateful PCE), comprising:

a memory storing instructions; and a processor configured to execute the instructions to cause the Stateful PCE to:

receive a path computation request message sent by a path computation client (PCC), wherein the path computation request message comprises first attribute information that designates an acquisition manner of a path requested by the PCC;

acquire information of a path that conforms to a request of the PCC according to the first attribute information, wherein acquiring the information of the path that conforms to the request of the PCC comprises searching a database for an already-established path or computing a to-be-newly established path; and send a path computation reply message to the PCC, wherein the path computation reply message comprises the information of the path that conforms to the request of the PCC;

wherein the acquisition manner of the path requested by the PCC is:

a manner of only accepting an already-established path in the database, or a manner of preferably accepting the already-established path, wherein the PCC gives priority to accepting an already-established path in the database, and when there is not an already-established path that conforms to the request of the PCC, the PCC accepts a to-be-newly-established path acquired by the Stateful PCE through computation, or a manner of only accepting a to-be-newly-established path, or a manner of preferably accepting the to-be-newly-established path, wherein the PCC gives priority to accepting a to-be-newly-established path computed by the Stateful PCE according to the request of the PCC, and when the computing the to-be-newly-established path by the Stateful PCE fails, an already-established path that conforms to the request of the PCC is accepted;

wherein the path computation reply message further comprises second attribute information that indicates an attribute of the path that conforms to the request of the FCC, wherein the attribute of the path that conforms to the request of the PCC is:

the path that conforms to the request of the PCC is a to-be-newly-established path, or the path that conforms to the request of the PCC is an already-established path.

5. The Stateful PCE according to claim 4, wherein the processor is further configured to:

when the acquisition manner of the path requested by the PCC is the manner of only accepting the already-established path, then search the database of already-established path information; wherein when there is a first path that conforms to the request of the PCC in the database, then the path computation reply message comprises information of the first path; and, wherein when there is not an already-established path that conforms to the request of the PCC in the database, then the path computation reply message comprises an acquisition failure indication; or, when the acquisition manner of the path requested by the PCC is the manner of preferably accepting the already-established path, then search the database, when there is a second path that conforms to the request of the PCC in the database, then the path computation reply message comprises information of the second path; when there is not an already-established path that conforms to the request of the PCC in the database, then compute a new path according to the request of the PCC, when the computing is successful, the path computation reply message comprises information of the to-be-newly-established path acquired through computation, when the computing is not successful, then the path computation reply message comprises the acquisition failure indication; or, when the acquisition manner of the path requested by the PCC is the manner of only accepting the to-be-newly-established path, then compute a new path according to the request of the PCC; wherein when the computing is successful, the path computation reply message comprises information of the to-be-newly-established path acquired through computation; and, wherein when the computing is not successful, then the path computation reply message comprises the acquisition failure indication; or, when the acquisition manner of the path requested by the PCC is the manner of preferably accepting the to-be-newly-established path, then compute a new path according to the request of the PCC, when the computing is successful, the path computation reply message comprises information of a third path acquired through computation; when the computing is not successful, search the database, when there is an already-established fourth path that conforms to the request of the PCC in the database, then the path computation reply message comprises information of the fourth path, when there is not an already-established path that conforms to the request of the PCC in the database, then the path computation reply message comprises the acquisition failure indication.

6. A path computation client (PCC), comprising:
a memory storing instructions; and
a processor configured to execute the instructions to cause the PCC to:
send a path computation request message to a stateful path computation element (Stateful PCE) to request a path that conforms to a request of the PCC, wherein the path computation request message comprises first attribute information that designates an acquisition manner of the path requested by the PCC;
receive a path computation reply message returned by the Stateful PCE, wherein the path computation reply message comprises information of the path that conforms to the request of the PCC and is acquired according to the first attribute information, wherein acquiring the information of the path that conforms to the request of the PCC comprises searching a database for an already-established path or computing a to-be-newly established path, wherein the path computation reply message further comprises second attribute information, and the second attribute information is used to indicate an attribute of the path that conforms to the request of the PCC, and the attribute of the path that conforms to the request of the PCC is: the path that conforms to the request of the PCC is a to-be-newly-established path, or the path that conforms to the request of the PCC is an already-established path; and
establish a forwarding path according to the information of the path comprised in the path computation reply message received by the processor;
wherein the acquisition manner of the path requested by the PCC is:
a manner of only accepting an already-established path in the database, or
a manner of preferably accepting the already-established path, wherein the PCC gives priority to accepting an already-established path in the database, and when there is not an already-established path that conforms to the request of the PCC, the PCC accepts a to-be-newly-established path acquired by the Stateful PCE through computation, or
a manner of only accepting a to-be-newly-established path, or
a manner of preferably accepting the to-be-newly-established path, wherein the PCC gives priority to accepting a to-be-newly-established path computed by the Stateful PCE according to the request of the PCC, and when the computing the to-be-newly-established path by the Stateful PCE fails, an already-established path that conforms to the request of the PCC is accepted.

7. A path acquisition system, comprising:
a stateful path computation element (Stateful PCE); and
a path computation client (PCC),
wherein:
the PCC is configured to send a path computation request message to the Stateful PCE to request a path that conforms to a request of the PCC, wherein the path computation request message comprises first attribute information that designates an acquisition manner of the path requested by the PCC;
the PCE is configured to receive the path computation request message sent by the PCC, acquire information of the path that conforms to the request of the PCC according to the first attribute information comprised in the path computation request message, wherein acquiring the information of the path that conforms to the request of the PCC comprises searching a database for an already-established path or computing a to-be-newly established path, and send a path computation reply message to the PCC, wherein the path computation reply message comprises the information of the path that conforms to the request of the PCC;
the PCC is further configured to receive the path computation reply message returned by the Stateful PCE, and establish a forwarding path according to the information of the path, wherein the path computation reply message further comprises second attribute information, and the second attribute information is used to indicate an attribute of the path that conforms to the request of the PCC and the attribute of the path that conforms to the request of the PCC is: the path that conforms to the request of the PCC is a to-be-newly-established path, or the path that conforms to the request of the PCC is an already-established path; and the acquisition manner of the path requested by the PCC is:
- a manner of only accepting an already-established path in the database, or
- a manner of preferably accepting the already-established path, wherein the PCC gives priority to accepting an already-established path in the database, and when there is not an already-established path that conforms to the request of the PCC, the PCC accepts a to-be-newly-established path acquired by the Stateful PCE through computation, or
- a manner of only accepting a to-be-newly-established path, or
- a manner of preferably accepting the to-be-newly-established path, wherein the PCC gives priority to accepting a to-be-newly-established path computed by the Stateful PCE according to the request of the PCC, and when the computing the to-be-newly-established path by the Stateful PCE fails, an already-established path that conforms to the request of the PCC is accepted.

8. The system according to claim 7, wherein the acquiring, by the Stateful PCE, the information of the path that conforms to the request of the PCC according to the first attribute information comprised in the path computation request message comprises:

when the acquisition manner of the path requested by the PCC is the manner of only accepting the already-established path, then the Stateful PCE searches the database of already-established path information; wherein when there is a first path that conforms to the request of the PCC in the database, then the path computation reply message comprises information of the first path; and, wherein when there is not an already-established path that conforms to the request of the PCC in the database, then the path computation reply message comprises an acquisition failure indication; or, when the acquisition manner of the path requested by the PCC is the manner of preferably accepting the already-established path, then the Stateful PCE searches the database, when there is a second path that conforms to the request of the PCC in the database, then the path computation reply message comprises information of the second path; when there is not an already-established path that conforms to the request of the PCC in the database, then the Stateful PCE computes a new path according to the request of the PCC, when the computing is successful, the path computation reply message comprises information of a to-be-newly-established path acquired through computation, when the computing is not successful, then the path computation reply message comprises the acquisition failure indication; or, when the acquisition manner of the path requested by the PCC is the manner of only accepting the to-be-newly-established path, then the Stateful PCE computes a new path according to the request of the PCC; wherein when the computing is successful, the path computation reply message comprises information of a to-be-newly-established path acquired through computation; and, wherein when the computing is not successful, then the path computation reply message comprises the acquisition failure indication; or, when the acquisition manner of the path requested by the PCC is the manner of preferably accepting the to-be-newly-established path, then the Stateful PCE computes a new path according to the request of the PCC, when the computing is successful, the path computation reply message comprises information of a third path acquired through computation; when the computing is not successful, the Stateful PCE searches the database, when there is an already-established fourth path that conforms to the request of the PCC in the database, then the path computation reply message comprises information of the fourth path, when there is not an already-established path that conforms to the request of the PCC in the database, then the path computation reply message comprises the acquisition failure indication.

* * * * *

UNITED STATES PATENT AND TRADEMARK OFFICE
CERTIFICATE OF CORRECTION

PATENT NO. : 10,230,618 B2
APPLICATION NO. : 14/757676
DATED : March 12, 2019
INVENTOR(S) : Dong et al.

Page 1 of 1

It is certified that error appears in the above-identified patent and that said Letters Patent is hereby corrected as shown below:

In the Claims

Claim 2, Column 19, Line 7, "FCC" should read -- PCC --.

Claim 3, Column 19, Line 54, "FCC" should read -- PCC --.

Claim 4, Column 20, Line 60, "FCC" should read -- PCC --.

Signed and Sealed this
Twenty-first Day of January, 2020

Andrei Iancu
*Director of the United States Patent and Trademark Office*